(12) United States Patent
Hirata et al.

(10) Patent No.: US 12,007,758 B2
(45) Date of Patent: Jun. 11, 2024

(54) PROCESS STATE MONITORING DEVICE AND PROCESS STATE MONITORING METHOD

(71) Applicant: JFE STEEL CORPORATION, Tokyo (JP)

(72) Inventors: Takehide Hirata, Tokyo (JP); Tatsuhiro Sue, Tokyo (JP); Masafumi Matsushita, Tokyo (JP); Yohei Harada, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 321 days.

(21) Appl. No.: 17/440,267

(22) PCT Filed: Mar. 24, 2020

(86) PCT No.: PCT/JP2020/012821
§ 371 (c)(1),
(2) Date: Sep. 17, 2021

(87) PCT Pub. No.: WO2020/196441
PCT Pub. Date: Oct. 1, 2020

(65) Prior Publication Data
US 2022/0187809 A1 Jun. 16, 2022

(30) Foreign Application Priority Data
Mar. 26, 2019 (JP) .................................. 2019-057695

(51) Int. Cl.
*G05B 19/418* (2006.01)
*G06F 3/14* (2006.01)

(52) U.S. Cl.
CPC ......... *G05B 19/41875* (2013.01); *G06F 3/14* (2013.01)

(58) Field of Classification Search
CPC ............................ G05B 19/41875; G06F 3/14
USPC .......................................................... 700/108
See application file for complete search history.

(56) References Cited

U.S. PATENT DOCUMENTS 5,586,197 A * 12/1996 Tsujimura ........... G06F 16/5838
382/162
6,311,130 B1 10/2001 Huang
6,616,759 B2 * 9/2003 Tanaka ................. G05B 13/048
118/63
(Continued)

FOREIGN PATENT DOCUMENTS

| CN | 101981601 A | 2/2011 |
| CN | 102402650 A | 4/2012 |

(Continued)

OTHER PUBLICATIONS

Apr. 12, 2022 Office Action issued in Japanese Patent Application No. 2020-545819.

(Continued)

*Primary Examiner* — Jigneshkumar C Patel
(74) *Attorney, Agent, or Firm* — Oliff PLC

(57) ABSTRACT

A process state monitoring device incudes a processor including hardware, the processor being configured to: separate two or more components from time series data of a value indicating a state of a process; compute a characteristic value from each of the separated components; and classify the state of the process on the basis of the computed characteristic values.

10 Claims, 2 Drawing Sheets

(56) References Cited

U.S. PATENT DOCUMENTS

| | | | |
|---|---|---|---|
| 8,994,359 B2* | 3/2015 | Neti | F03D 7/0272 |
| | | | 324/71.1 |
| 2003/0219771 A1 | 11/2003 | Bevilacqua et al. | |
| 2004/0078160 A1 | 4/2004 | Frei et al. | |
| 2005/0287576 A1 | 12/2005 | Bevilacqua et al. | |
| 2007/0171085 A1 | 7/2007 | Imai et al. | |
| 2010/0086935 A1 | 4/2010 | Bevilacqua et al. | |
| 2011/0010106 A1 | 1/2011 | Katsukura et al. | |
| 2012/0077199 A1 | 3/2012 | Bevilacqua et al. | |
| 2014/0169677 A1* | 6/2014 | Wu | G06V 40/168 |
| | | | 382/190 |
| 2015/0276557 A1 | 10/2015 | Masuda et al. | |
| 2017/0052060 A1 | 2/2017 | Prada et al. | |
| 2018/0219889 A1* | 8/2018 | Oliner | G06N 3/04 |
| 2020/0110394 A1 | 4/2020 | Hirata | |

FOREIGN PATENT DOCUMENTS

| | | |
|---|---|---|
| CN | 106844161 A | 6/2017 |
| CN | 109308447 A | 2/2019 |
| JP | 2010-128661 A | 6/2010 |
| JP | 2012-155361 A | 8/2012 |
| JP | 2013-114362 A | 6/2013 |
| JP | 5499900 B2 | 5/2014 |
| JP | 5651998 B2 | 1/2015 |
| JP | 2016-164772 A | 9/2016 |
| JP | 5996384 B2 | 9/2016 |
| JP | 2018-014093 A | 1/2018 |
| JP | 2018014093 A * | 1/2018 |
| JP | 2019-113970 A | 7/2019 |
| WO | 2018/235807 A1 | 12/2018 |

OTHER PUBLICATIONS

Jun. 23, 2020 International Search Report issued in International Patent Application No. PCT/JP2020/012821.

Apr. 19, 2022 Extended Search Report issued in European Patent Application No. 20777340.9.

Dec. 15, 2022 Office Action issued in Korean Patent Application No. 10-2021-7028937.

Feb. 23, 2024 Office Action issued in Chinese Patent Application No. 202080023623.4 (with partial translation).

Dec. 26, 2023 Office Action issued in Korean Patent Application No. 10-2021-7028937.

* cited by examiner

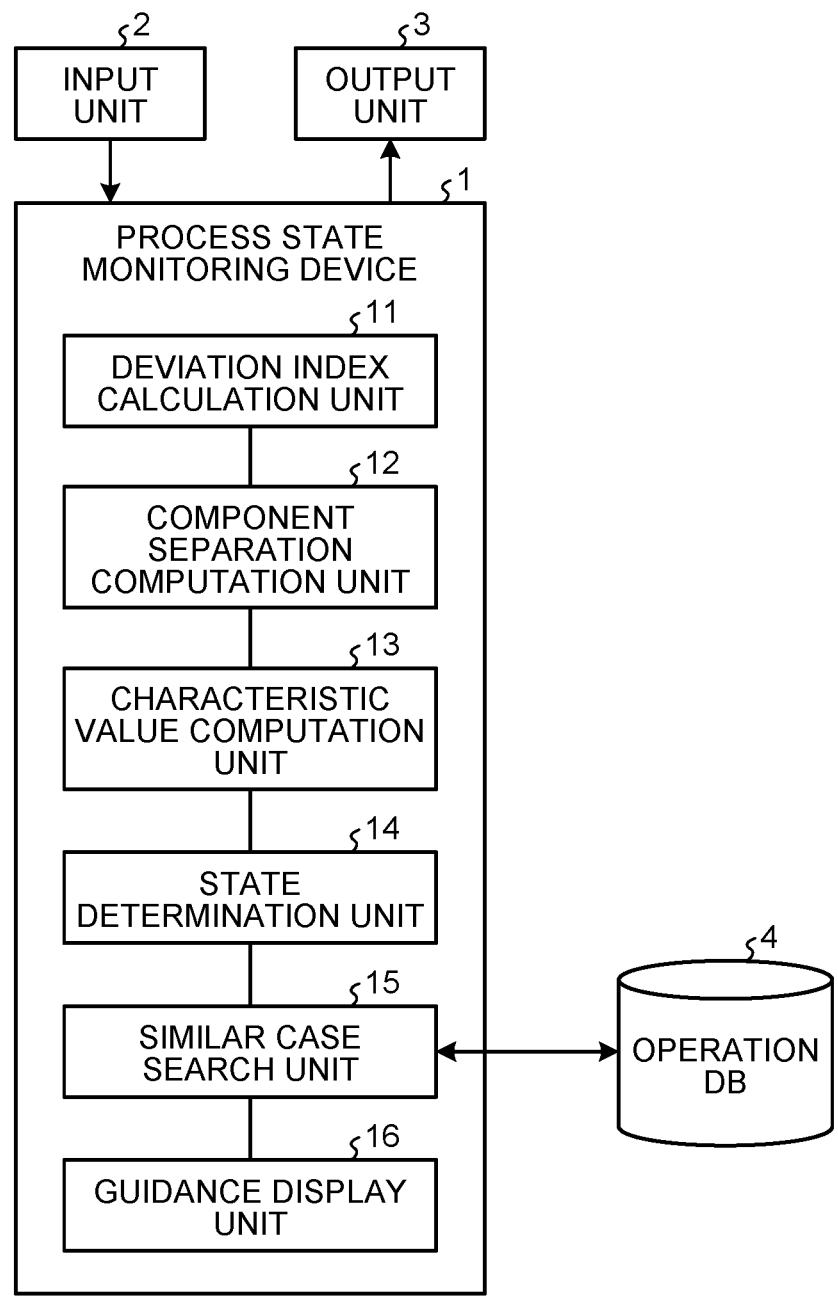

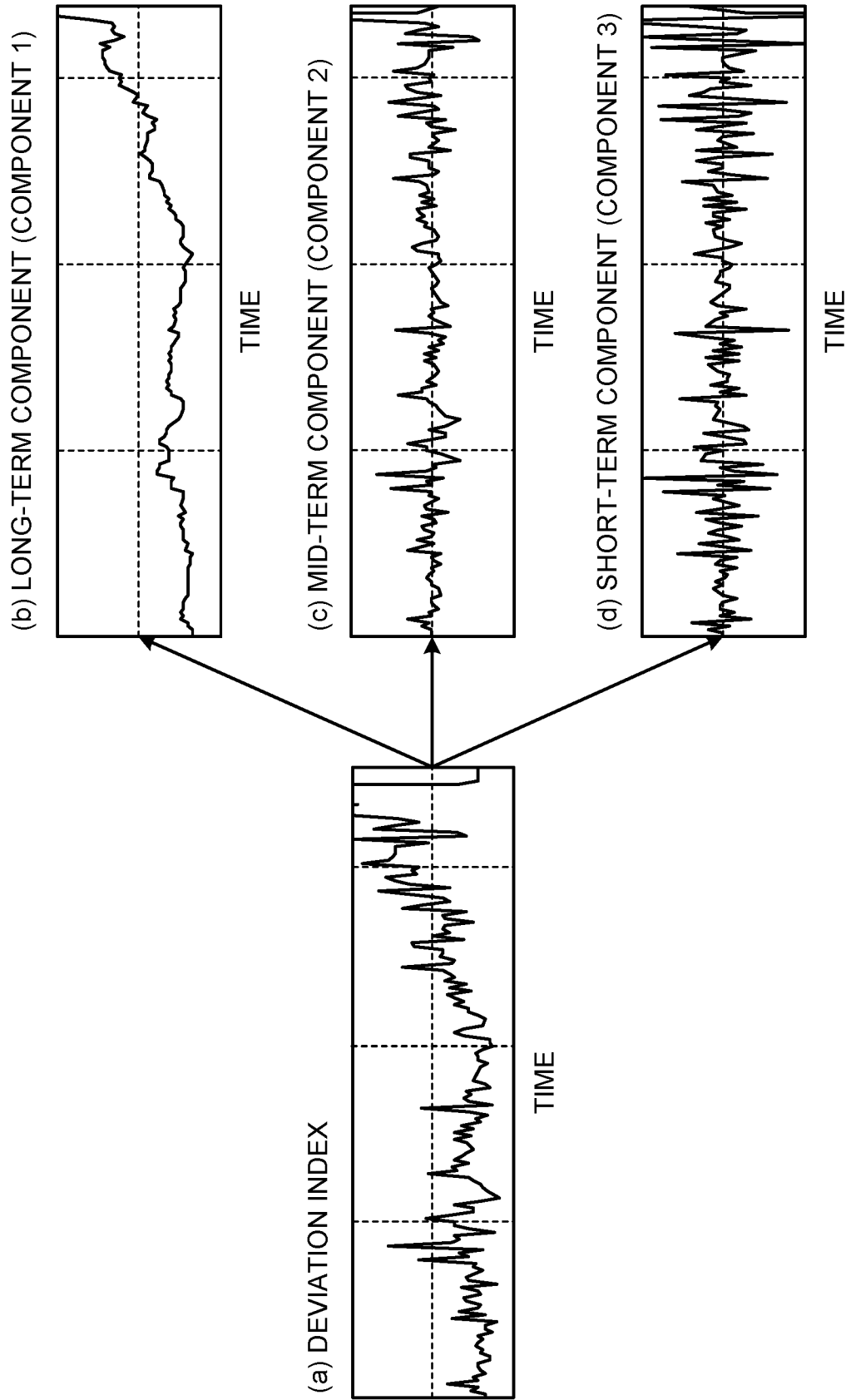

PROCESS STATE MONITORING DEVICE AND PROCESS STATE MONITORING METHOD

FIELD

The present invention relates to a process state monitoring device and a process state monitoring method that monitor a state of a process such as a manufacturing process.

BACKGROUND

For methods of diagnosing states, particularly abnormal states, of processes such as manufacturing processes, power generation processes, conveyance processes, and waste liquid treatment processes, a model base approach and a database approach are available. The model base approach constructs a model that expresses a physical or a chemical phenomenon in a process with a mathematical expression, and diagnoses the state of the process using the constructed model. On the other hand, the database approach constructs a statistical analytic model from operation data obtained in a process and diagnoses the state of the process using the constructed model.

In the manufacturing process such as a steel process, a vast number of operation patterns are present because various types and sizes of products are manufactured in a single manufacturing line. The manufacturing process such as a blast furnace process varies largely because natural objects such as iron ore and coke are used as raw materials. When the manufacturing state of the manufacturing process such as the steel process is diagnosed, the approach based on only the model base approach, thus, has a limitation.

The database approach includes: a diagnosis method that makes operation data at the past occurrences of abnormalities into a database and determines a resemblance to current operation data; and a diagnosis method that makes, conversely, operation data at normal operation into a database and determines a difference from current operation data. However, in the manufacturing process such as the steel process, which uses a large number of pieces of equipment for manufacturing, an unprecedented trouble often occurs in a case where a lot of equipment is aged, particularly like Japan. The former diagnosis method based on the past trouble cases, thus, has a limit to the diagnosis of abnormal states.

On the other hand, the latter diagnosis methods include those described in Patent Literatures 1 and 2. Patent Literatures 1 and 2 describe methods each of which extracts patterns from operation data at normal operation, makes the patterns into a library, and determines a difference between the acquired operation data and the patterns in the library, thereby detecting an unusual situation early. With the methods, an unusual situation even when the operation pattern at normal operation is not a single pattern can be reliably detected. The methods, however, have concerns that the number of patterns continues to increase every operation when a vast number of operation patterns are present in the manufacturing process. As a method to solve such problems, a method is described in Patent Literature 3. Patent Literature 3 describes a method that obtains variation indexes from prediction errors of a plurality of sub-models once and determines the state of a process on the basis of the patterns of the deviation indexes. With the method, inherently unusual situations can be organized efficiently because diversity is limited in the states represented by the sub-models.

CITATION LIST

Patent Literature

Patent Literature 1: Japanese Patent No. 5651998
Patent Literature 2: Japanese Patent No. 5499900
Patent Literature 3: Japanese Patent Application Laid-open No. 2018-014093

SUMMARY

Technical Problem

However, since the occurrence forms of the deviation indexes differ according to the contents of troubles, the method described above cannot monitor the state of process thoroughly. For example, for a target that a process is performed by repeated batch processes, the deviation indexes corresponding to the state of the machine slowly increase between the batch processes of the process in the case of deterioration of equipment machine accuracy with an elapse of time. In contrast, when a sudden failure occurs, the corresponding deviation index steeply increases in the batch process of the process. A sudden failure occurring between the batch processes can be found as abnormal before start of the next batch process. Measures, thus, can be taken in advance. The failure does not become a big problem. When a trouble occurs in a control system, the trouble often causes hunting. In this case, the deviation index fluctuates with a characteristic frequency in the batch process. When a sensor failure or a disturbance fluctuation occurs, noises are increased. When a cable failure occurs, pulse-like noises are superimposed. Even when a process is a target that is operated continuously and successively, a certain time period is preliminarily defined that can evaluate regular operation taking into consideration of dynamic characteristics of the process, and result data is managed for each certain time period, the same situation as that described above occurs. When a model taken into consideration of dynamic characteristics of a process is defined and result data is managed for each preliminarily defined certain time period, such as on a minute basis, on an hour basis, or on a day basis, using the deviation indexes computed by the model, the same situation as that described above occurs. Therefore, it has been expected that a technique is provided that can identify a trouble further in detail by taking into consideration of an occurrence form of the deviation index.

The invention is made in view of above problems, and an object of the present invention is to provide a process state monitoring device and a process state monitoring method that can identify a state of a process in detail.

Solution to Problem

To solve the problem and achieve the object, a process state monitoring device according to the present invention includes: a component separation computation unit configured to separate two or more components from time series data of a value indicating a state of a process; a characteristic value computation unit configured to compute a characteristic value from each component separated by the component separation computation unit; and a state determination unit configured to classify the state of the process on the basis of the characteristic values computed by the characteristic value computation unit.

Moreover, the process state monitoring device according to the present invention further includes a similar case search unit configured to search a past database for an operation case similar to the process on the basis of the characteristic values computed by the characteristic value computation unit.

Moreover, in the process state monitoring device according to the present invention, the time series data is time series data of a difference value between a prediction value and a result value of the value.

Moreover, in the process state monitoring device according to the present invention, the time series data is time series data of a difference value between the value and a preset value obtained at a time at which the state of the process is normal, or time series data of a value of a ratio of the value to the preset value obtained at the time at which the state of the process is normal.

Moreover, in the process state monitoring device according to the present invention, the component separation computation unit is configured to separate the components from the time series data by filtering processing.

Moreover, in the process state monitoring device according to the present invention, the characteristic value computation unit is configured to compute, as the characteristic value, at least one of statistics including an average value, a maximum value, a difference value between the maximum value and a minimum value, a standard deviation, a difference value between a front half portion and a rear half portion, an average number of crossings, and a computation value based on the difference value between the maximum value and the minimum value.

Moreover, in the process state monitoring device according to the present invention, the state determination unit is configured to classify the state of the process using a machine learning technique.

Moreover, in the process state monitoring device according to the present invention, the similar case search unit is configured to determine a similarity of each operation case on the basis of a distance and/or an angle in a variable space composed of a plurality of characteristic values, and compute, as a contribution, the component contributing to the similarity.

Moreover, the process state monitoring device according to the present invention further includes a guidance display unit configured to display the similarity and the contribution of each operation case, the similarity and the contribution being computed by the similar case search unit, and an action taken in, and an operation state of, the searched operation case.

Moreover, a process state monitoring method according to the present invention includes: a component separation computation step of separating two or more components from time series data of a value indicating a state of a process; a characteristic value computation step of computing a characteristic value from each component separated at the component separation computation step; and a state determination step of classifying the state of the process on the basis of the characteristic values computed at the characteristic value computation step.

Advantageous Effects of Invention

The process state monitoring device and the process state monitoring method according to the present invention can identify the state of the process in detail.

BRIEF DESCRIPTION OF DRAWINGS

FIG. 1 is a block diagram illustrating a structure of a process state monitoring device in an embodiment of the present invention.

FIG. 2 is a diagram illustrating an example where three components are separated from a deviation index.

DESCRIPTION OF EMBODIMENT

The following describes a structure of a process state monitoring device in an embodiment of the present invention with reference to the attached drawings.

FIG. 1 is a block diagram illustrating the structure of the process state monitoring device in the embodiment of the present invention. As illustrated in FIG. 1, a process state monitoring device 1 in the embodiment of the present invention is a device to diagnose states of processes such as manufacturing processes, power generation processes, conveyance processes, and waste liquid treatment processes, and is structured by an information processing device such as a computer. In the embodiment, an input unit 2, an output unit 3, and an operation database (operation DB) 4 are connected to the process state monitoring device 1.

As a result of a computation processing device in the information processing device executing a computer program, the process state monitoring device 1 functions as a deviation index calculation unit 11, a component separation computation unit 12, a characteristic value computation unit 13, a state determination unit 14, a similar case search unit 15, and a guidance display unit 16.

The deviation index calculation unit 11 calculates a deviation index that indicates by what degree the state of the process is deviated from the state when the process state is normal using time series data of a value indicating the state of the process, the time series data being input from the input unit 2. Specifically, when the value indicating the state of the process is a detection value of any of a vibration sensor, an acoustic sensor, and a temperature sensor that are installed in or near equipment, the detection value is a value indicating the state of the equipment. Thus, a computation to compare a value at the normal process state with the detection value is enough. For example, the deviation index calculation unit 11 sets a normal time period preliminarily and computes an average value and a standard deviation of the detection values in the time period. This makes it possible for the deviation index to be calculated as (the detection value—the average value in the normal time period)/the standard deviation in the normal time period. When the value indicating the state of the process is not the value indicating the state of the equipment directly as described above, a model is structured that predicts the value and a difference between the prediction value by the model and an actual value can be set as the deviation index. As the model described above, a theoretical model, a multiple regression model, and a statistical model can be exemplified. When the equipment is rolling equipment, as a value indicating the state of the equipment, a differential load, a sum load, a roll position, and a tension between pieces of rolling equipment can be exemplified.

The component separation computation unit 12 separates at least two or more components from the deviation index computed by the deviation index calculation unit 11 for each predetermined certain time period, such as for each bath process of the process. The following describes an example where data is processed for each batch process. The same processing can be also done for the data processing performed for each predetermined certain time period. Specifically, the component separation computation unit 12 separates two or more frequency components having different time constants from the deviation index using filtering processing such as an exponential smoothing method, or multiplex resolution analysis, which is one of wavelet analysis. FIGS. 2(a) to 2(d) illustrate an example where three components (a long-term component, a mid-term component, and a short-term component) are separated from the deviation index using an exponential smoothing method. The long-term component (low frequency component) illustrated in FIG. 2(b) indicates a trend of the most smoothed deviation index. The short-term component (high frequency component) illustrated in FIG. 2(d) has the most variation components. The mid-term component (intermediate frequency component) illustrated in FIG. 2(c) is regarded to be between the long-term component and the short-term component. The original deviation index illustrated in FIG. 2(a) is obtained by summing the three components illustrated in FIGS. 2(b) to 2(d).

The characteristic value computation unit 13 computes, for each bath process of the process, a characteristic value from each component computed by the component separation computation unit 12. Specifically, the characteristic value computation unit 13 computes at least one of statistics from each component separated by the component separation computation unit 12 for each bath process of the process. The statistics include: an average value, a maximum value, a difference value (max-min) between the maximum value and a minimum value, a standard deviation, a difference value between a front half portion and a rear half portion for clarifying a trend of a waveform, the number of crossings with the average value (average number of crossings) and a density of an average crossing obtained by dividing the average number of crossings by the number of pieces of data in the batch process for catching frequency components of the wave form, and a computation value based on the difference value between the maximum value and the minimum value for catching a pulse waveform. The values computed as the characteristic values are not limited to those described above. The values may be applicable that are obtained by extracting periodic features, for example. Here, the difference value between the front half portion and the rear half portion means a difference between the average values of the half portions of data of the batch process separated by half and half based on time or the number of pieces of data, for example. However, the separation manner is not limited to that described above. The data distribution for the front and rear half portions may be changed taking into consideration of a generated phenomenon, for example. Such feature amounts can catch a rising trend of abnormal control input due to abnormality of an instrument and sharp output drop due to an instrument failure. The computation value based on the difference value between the maximum value and the minimum value for catching a pulse waveform means, in data of the batch process, the number of pieces of data that exceeds "(difference value between the maximum value and the minimum value)/2+the minimum value" or the density obtained by dividing the number of pieces of data by the number of all pieces of data, for example. These values have advantages that features can be extracted even when the frequency cannot be measured accurately due to the small number of pieces of data, and calculated and structured easily. Here, for example, the characteristic value computation unit 13 computes the following statistics. For the long-term component illustrated in FIG. 2(b), the average value, the difference value between the maximum value and the minimum value, and the difference value between the front and rear half portions are computed. For the mid-term component illustrated in FIG. 2(c) and the short-term component illustrated in FIG. 2(d), the difference value between the maximum value and the minimum value, the standard deviation, the average number of crossings, and the computation value based on the difference value between the maximum value and the minimum value are computed.

The state determination unit 14 classifies the state of the process using the characteristic values computed by the characteristic value computation unit 13. Specifically, the state determination unit 14 determines which trouble is included in the batch process of the target process using a classification model that represents relations between preliminarily prepared characteristic values and trouble contents. The classification model can be structured using machine learning because which trouble occurs in which equipment is determined by a variable name, a component, and the characteristic value of target data. That is, the characteristic values for each variable and for each component are given as input to the machine learning, and then labels of the trouble contents are given, thereby making it possible to structure the classification model. As the machine learning methods, a decision tree, a support vector machine, a neural network, and the like, can be used.

Table 1 illustrates an example of the classification model. As illustrated in Table 1, a slow change between the batch processes can be caught by the average value computed from the long-term component (a component 1) illustrated in FIG. 2(b). In this case, a major trouble example is aging deterioration of the machine accuracy of the equipment. A steep change in the batch process can be caught by the difference value between the maximum value and the minimum value computed for the component 1. In this case, a major trouble example is a sudden failure of a part structuring the equipment. On the other hand, a periodic fluctuation in the batch process can be caught by the standard deviation, and the difference value between the maximum value and the minimum value computed for the mid-term component (a component 2) illustrated in FIG. 2(c). In this case, a major trouble example is control system hunting (e.g., hunting of a tension component). An increase in noise can be caught by the standard deviation computed for the short-term component (a component 3) illustrated in FIG. 2(d). In this case, a major trouble example is a sensor noise and a disturbance fluctuation. The pulse-like noise can be caught by the difference value between the maximum value and the minimum value computed for the component 3. In this case, a major trouble example is a sensor cable failure and the like.

TABLE 1

| Component | Characteristic value | Change in characteristic value | Trouble example |
| --- | --- | --- | --- |
| Component 1 | Average value | Slow change between batches | Aging deterioration of machine accuracy of equipment |
|  | max − min | Steep change in batch | Sudden failure of part structuring equipment |
| Component 2 | Standard deviation max − min | Periodic fluctuation | Control system hunting |

TABLE 1-continued

| Component | Characteristic value | Change in characteristic value | Trouble example |
|---|---|---|---|
| Component 3 | Standard deviation | Increase in noise | Sensor noise, Disturbance fluctuation |
| | max − min | Pulse-like noise | Sensor cable failure |

The similar case search unit 15 searches the operation DB 4 for data of operation cases similar to the target process by using the characteristic values computed by the characteristic value computation unit 13. Specifically, the similar case search unit 15 defines a distance in a variable space composed of the characteristic values computed for each variable and for each component, and computes, as a similarity, a resemblance between the target process and the past operation case stored in the operation DB 4 on the basis of the distance. The similar case search unit 15 outputs the past operation cases to the output unit 3 in decreasing order of similarities. As an example of the distance definition, a Euclidean distance can be exemplified. As the computation method of the similarity, as illustrated in Table 2, a cosine similarity based on an angle between characteristic value vectors can be exemplified in addition to the similarity based on the Euclidean distance between the characteristic value vectors composed of the characteristic values of the operation cases. The cosine similarity calculates a cosine value of an angle made between two vectors on the basis of a mathematical formula of an inner product of two vectors (a·b in Table 2). The use of the search method using which similarity can be selected depending on the situation of the trouble. For an example of the selection, it can be considered that the similarity based on the Euclidean distance is used when the number of characteristic values to be compared is small (a case where the cause of the trouble is clear) while the cosine similarity is used when the number of characteristic values to be compared is large (a case where the cause of the trouble is not clear). Alternatively, the cosine similarity is used for finding a tendency of an output, not a size, of each characteristic value because the cosine similarity is based on calculation of an angle. The cosine similarity is, thus, suitable for finding a tendency at a high dimension. For example, when the cosine similarity is used for rolling process, a tendency of the characteristic values of all signals relating to a single rolling mill is observed to grasp an abnormal tendency of the whole machine, thereby making it possible to search for past similar cases. On the other hand, the similarity based on the Euclidean distance is suitable for searching for the past cases using the characteristic value vectors structured at a low dimension because the similarity based on the Euclidean distance places importance on the size of each characteristic value.

TABLE 2

| | Similarity calculation formula | Contribution calculation formula |
|---|---|---|
| Similarity based on Euclidean distance | $\frac{1}{1+d}$ | $e^{-d_i}$ |
| Cosine similarity | $\frac{a \cdot b}{\|a\| \|b\|}$ | $\frac{1}{1+e^{-a_i \cdot b_i}}$ |

The guidance display unit 16 displays, as guidance, the details of the trouble case from data of the past troubles when the similarity computed by the similar case search unit 15 exceeds a set threshold. As the guidance display content, in addition to designated observation data or a setting value that indicates the operation state of the trouble case, an action (e.g., an item and operation amount of an operation end operated by the operation of the target process) taken for trouble prevention can be exemplified. The guidance display includes not only the registered contents but also the characteristic value contributing to the similarity as a contribution. Here, the contribution that indicates the characteristic value contributing to the resemblance to the trouble case is calculated on the basis of the similarity computation method of the trouble as illustrated in Table 2. In Table 2, d represents the Euclidean distance between two points for similarity search, $d_i$ represents the distance of i-th characteristic value, a and b represent the vectors of the two search points, and $a_i$ and $b_i$ represent i-th elements of the respective vectors. The guidance display of these contributions allows factors contributing to the similar characteristics to be indicated quantitatively, thereby making it easy to estimate the cause of the trouble. As described above, the guidance display unit 16 displays the similarity, contribution, actual action taken in the past trouble, and the operation state at the trouble time to perform guidance.

As apparent from the above description, the process state monitoring device 1 in the embodiment of the present invention includes: the component separation computation unit 12 that separates two or more components from the deviation index; the characteristic value computation unit 13 that computes, for each bath process of the process, the characteristic value from each component separated by the component separation computation unit 12; and the state determination unit 14 that classifies the state of the process on the basis of the characteristic values computed by the characteristic value computation unit 13, thereby making it possible to identify the state of the process in detail.

The embodiment to which the present invention made by the inventors is applied has been described above. The present invention is, however, not limited by the description and the drawings, which are part of the disclosure of the present invention, of the embodiment. In the embodiment, for example, two or more components are separated from the time series data of the value indicating the state of the process (e.g., data of a single point of a rolled material). However, the time series data may be converted into data in a length direction (e.g., data in the length direction of the rolled material) and two or more components may be separated from the data in the length direction. In the embodiment, the aspect that uses data for each batch process of the process is described. However, the technology of the present invention can be applied when the process is a target that is operated continuously and successively, and in which a certain time period is preliminarily defined that can evaluate regular operation taking into consideration of dynamic characteristics of the process, and result data is managed for each certain time period, as described above. The process is, thus, included in the scope of the present invention. The certain time period is not always required to be the identical time period. The certain time period can be determined in various ways such as on a minute basis, on an hour basis, on a day basis, or a batch basis as long as the deviation index can be evaluated. They are also included in the scope of the present invention. Other embodiments, examples, operation techniques, and the like that are practiced by those skilled in the art are all included in the scope of the present invention.

INDUSTRIAL APPLICABILITY

According to the present invention, a process state monitoring device and a process state monitoring method that can identify the state of the process in detail can be provided.

REFERENCE SIGNS LIST

1 Process state monitoring device
2 Input unit
3. Output unit
4 Operation database (operation DB)
11 Deviation index calculation unit
12 Component separation computation unit
13 Characteristic value computation unit
14 State determination unit
15 Similar case search unit
16 Guidance display unit

The invention claimed is:

1. A process state monitoring device comprising a processor comprising hardware, the processor being configured to:
   separate two or more components from time series data of a value indicating a state of a process;
   compute a characteristic value from each of the separated components;
   classify the state of the process on the basis of the computed characteristic values;
   search a past database for an operation case similar to the process on the basis of the computed characteristic values;
   determine a similarity of the computed characteristic values and characteristic values of the operation case on the basis of a distance or an angle, in a variable space composed of a plurality of characteristic values, depending on the number of characteristic values to be compared; and
   compute, as a contribution, the component contributing to the similarity.

2. The process state monitoring device according to claim 1, wherein the time series data is time series data of a difference value between a prediction value and a result value of the value.

3. The process state monitoring device according to claim 2, wherein the processor is configured to separate the components from the time series data by filtering processing.

4. The process state monitoring device according to claim 1, wherein the time series data is
   time series data of a difference value between the value and a preset value obtained at a time at which the state of the process is normal, or
   time series data of a value of a ratio of the value to the preset value obtained at the time at which the state of the process is normal.

5. The process state monitoring device according to claim 4, wherein the processor is configured to separate the components from the time series data by filtering processing.

6. The process state monitoring device according to claim 1, wherein the processor is configured to separate the components from the time series data by filtering processing.

7. The process state monitoring device according to claim 1, wherein the processor is configured to compute, as the characteristic value, at least one of statistics including an average value, a maximum value, a difference value between the maximum value and a minimum value, a standard deviation, a difference value between a front half portion and a rear half portion, an average number of crossings, and a computation value based on the difference value between the maximum value and the minimum value.

8. The process state monitoring device according to claim 1, wherein the processor is configured to classify the state of the process using a machine learning technique.

9. The process state monitoring device according to claim claim 1, further comprising a guidance display configured to display
   the similarity and the contribution of the operation case, the similarity and the contribution being computed by the processor, and
   an action taken in, and an operation state of, the searched operation case.

10. A process state monitoring method comprising:
    separating two or more components from time series data of a value indicating a state of a process;
    computing a characteristic value from each of the separated components;
    classifying the state of the process on the basis of the computed characteristic values;
    searching a past database for an operation case similar to the process on the basis of the computed characteristic values;
    determining a similarity of the computed characteristic values and characteristic values of the operation case on the basis of a distance or an angle, in a variable space composed of a plurality of characteristic values, depending on the number of characteristic values to be compared; and
    computing, as a contribution, the component contributing to the similarity.

* * * * *